(12) United States Patent
Chinavare et al.

(10) Patent No.: US 10,688,823 B2
(45) Date of Patent: Jun. 23, 2020

(54) REINFORCED COMPOSITE VEHICLE WHEEL AND METHOD OF CONSTRUCTION THEREOF

(71) Applicant: Lacks Enterprises, Inc., Grand Rapids, MI (US)

(72) Inventors: Kevin Chinavare, Middleville, MI (US); James Ardern, Union Lake, MI (US); Garry Van Houten, Middleville, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 124 days.

(21) Appl. No.: 15/805,343

(22) Filed: Nov. 7, 2017

(65) Prior Publication Data
US 2018/0126776 A1    May 10, 2018

Related U.S. Application Data

(60) Provisional application No. 62/418,580, filed on Nov. 7, 2016.

(51) Int. Cl.
*B60B 3/12* (2006.01)
*B60B 3/08* (2006.01)
*B60B 3/10* (2006.01)
*B60B 21/12* (2006.01)
*B60B 7/06* (2006.01)
*B60B 5/02* (2006.01)

(52) U.S. Cl.
CPC .............. *B60B 3/12* (2013.01); *B60B 3/087* (2013.01); *B60B 3/10* (2013.01); *B60B 21/12* (2013.01); *B60B 5/02* (2013.01); *B60B 7/063* (2013.01); *B60B 7/065* (2013.01); *B60B 2310/318* (2013.01); *B60B 2360/10* (2013.01); *B60B 2360/30* (2013.01); *B60B 2360/32* (2013.01); *B60B 2360/3416* (2013.01); *B60B 2900/111* (2013.01); *B60B 2900/311* (2013.01); *B60B 2900/572* (2013.01); *Y02T 10/86* (2013.01)

(58) Field of Classification Search
CPC B60B 3/12; B60B 21/12; B60B 3/087; B60B 3/10; B60B 2360/30; B60B 7/065; B60B 7/063; B60B 2360/10; B60B 5/02; B60B 2310/318; B60B 2900/311; B60B 2360/32; B60B 2360/3416; B60B 2900/111; B60B 2900/572; Y02T 10/86
USPC ...................................... 301/37.107
See application file for complete search history.

(56) References Cited

U.S. PATENT DOCUMENTS 9,517,656 B2 * 12/2016 von Roenne ............. B60B 7/08
9,863,497 B2 *  1/2018 Lim ......................... B60B 1/06
(Continued)

*Primary Examiner* — S. Joseph Morano
*Assistant Examiner* — Jean W Charleston
(74) *Attorney, Agent, or Firm* — Dickinson Wright PLLC

(57) ABSTRACT

A composite wheel assembly and method of construction thereof is provided. The composite wheel assembly includes a wheel having an inwardly facing surface, an outwardly facing surface, a generally cylindrical barrel portion, and a plurality of apertures formed about a central hub aperture. At least one wheel cladding is fixedly bonded to at least one of the inwardly facing surface, the outwardly facing surface, and the generally cylindrical barrel portion. The wheel cladding increases the stiffness and/or strength of the wheel between about 2-16% or greater as compared to the wheel not having the at least one cladding.

19 Claims, 8 Drawing Sheets

(56) References Cited

U.S. PATENT DOCUMENTS

| | | | | |
|---|---|---|---|---|
| 2009/0026831 A1* | 1/2009 | Acker | ............ | B60B 3/002 |
| | | | | 301/11.3 |
| 2011/0291465 A1* | 12/2011 | Peschiutta | ............ | B60B 7/006 |
| | | | | 301/37.102 |
| 2013/0026816 A1* | 1/2013 | Kia | ............ | B60B 1/14 |
| | | | | 301/95.102 |
| 2014/0159469 A1* | 6/2014 | Chinavare | ............ | B60B 3/10 |
| | | | | 301/37.102 |
| 2014/0265535 A1* | 9/2014 | Stratton | ............ | B60B 7/18 |
| | | | | 301/37.102 |
| 2016/0152069 A1* | 6/2016 | Pieronek | ............ | B60B 3/04 |
| | | | | 301/37.101 |

* cited by examiner

REINFORCED COMPOSITE VEHICLE WHEEL AND METHOD OF CONSTRUCTION THEREOF

CROSS-REFERENCE TO RELATED APPLICATION

This application claims the benefit of U.S. Provisional Application Ser. No. 62/418,580, filed Nov. 7, 2016, which is incorporated herein by reference in its entirety.

FIELD OF THE DISCLOSURE

The present disclosure relates generally to automotive vehicles, and more particularly to a composite vehicle wheel assembly that yields increased stiffness.

BACKGROUND OF THE DISCLOSURE

Vehicle wheel assemblies have taken on more aerodynamic shapes and have been reduced in material thickness to enhance the ride performance and appearance of modern, high performance vehicles. It is known to provide wheel assemblies with plated surfaces or a cladding of thin plastic over the wheel outboard surface to enhance their aesthetic appearance. Although the appearance of the wheel assemblies is enhanced by these plating and cladded surfaces, the strength and bending stiffness of the wheel assemblies is largely unaffected by their presence. As such, the metal material that forms the wheel must provide the entirety of the strength and bending resistance required for the vehicle. Although the metal can be formed to meet the strength and bending resistance requirements, it comes at a cost, including increased weight and size of the wheel, as well as the cost of the metal material itself.

SUMMARY OF THE DISCLOSURE

This section provides a general summary of the present disclosure and is not intended to be interpreted as a comprehensive disclosure of its full scope or all of its features, aspects and objectives.

One aspect of the present disclosure is to provide a composite wheel assembly comprising a wheel having an inwardly facing surface and an outwardly facing surface, a plurality of apertures formed about a central hub aperture, a plurality of spokes extending radially outwardly from the central hub aperture, and a plurality of turbine openings formed between the plurality of spokes; and at least one wheel cladding fixedly bonded to at least one of the inwardly facing surface and the outwardly facing surface of the wheel, the wheel cladding enhancing the stiffness and/or strength of the wheel between about 2-16% or greater.

Another aspect of the present disclosure is to provide a wheel cladding being formed of at least one of the following materials: carbon fiber, fiber-glass, molded thermoplastic or thermoset polymer, Kevlar®, an alternative metal, or any other non-standard plastic material.

Another aspect of the present disclosure is to fixedly bond the wheel cladding to the wheel via at least one of urethane foam, a room temperature vulcanization silicone adhesive, or an alternate adhesive, such as epoxy or silicone-based hot melt adhesive.

Another aspect of the present disclosure includes providing the at least one wheel cladding includes a single, monolithic piece of material having a central hub region, an outer peripheral rim, and a plurality of spokes extending radially between the central hub region and the outer peripheral rim fixed to the outwardly facing surface of the wheel.

Another aspect of the present disclosure is to provide the at least one wheel cladding with a plurality of separate wheel claddings fixed to at least some of the spokes.

Another aspect of the present disclosure is to provide at least some of the spokes having a recessed pocket extending into the outwardly facing surface and providing at least some of the wheel claddings being fixed within the recessed pockets.

Another aspect of the present disclosure is to provide at least some of the spokes having a relief pocket formed on the inwardly facing surface of the spokes and to provide at least some of the at least one wheel cladding including insert members disposed in each of the relief pockets.

Another aspect of the present disclosure is to provide the at least one wheel cladding including an annular stiffening band secured to a generally cylindrical barrel portion of the wheel to impart stiffness to the wheel.

Another aspect of the present disclosure is to provide the annular stiffening band abutting a radially outwardly facing outer surface of the generally cylindrical barrel portion.

Another aspect of the present disclosure is to provide the annular stiffening band abutting a radially inwardly facing inner surface of the generally cylindrical barrel portion.

Another aspect of the present disclosure is to provide the at least one wheel cladding including a plurality of annular wheel claddings fixed within the turbine openings.

Another aspect of the present disclosure includes a composite wheel assembly including a wheel having an inwardly facing surface, an outwardly facing surface, a generally cylindrical barrel portion, and a plurality of apertures formed about a central hub aperture. The composite wheel assembly further includes at least one wheel cladding fixedly bonded to at least one of the inwardly facing surface, the outwardly facing surface, and the generally cylindrical barrel portion, wherein the wheel cladding enhances the stiffness and/or strength of the wheel between about 2-16% or greater.

Another aspect of the present disclosure includes a composite wheel assembly including a wheel having an inwardly facing surface, an outwardly facing surface, a generally cylindrical barrel portion, and a plurality of apertures formed about a central hub aperture. The composite wheel assembly further includes at least one wheel cladding fixedly bonded to each of the inwardly facing surface, the outwardly facing surface, and the generally cylindrical barrel portion, wherein the wheel cladding enhances the stiffness and/or strength of the wheel between about 2-16% or greater.

Another aspect of the present disclosure is to provide the composite wheel assembly having an aerodynamic envelop.

Another aspect of the present disclosure is to provide the composite wheel assembly having a minimal envelop and weight.

Another aspect of the present disclosure is to provide the wheel cladding having a decorative outwardly facing surface.

In accordance with yet another aspect of the present disclosure, a method of constructing a composite wheel assembly is provided. The method includes providing a wheel having an inwardly facing surface, an outwardly facing surface, and a generally cylindrical barrel portion, with a plurality of apertures formed about a central hub aperture. Further, increasing the stiffness and/or strength of the wheel between about 2-16% or greater by fixedly bonding a wheel cladding to at least one of the inwardly facing surface, the outwardly facing surface and the generally cylindrical barrel portion.

Another aspect of the method of construction includes providing the wheel cladding being formed of at least one of the following materials: carbon fiber, fiber-glass, molded thermoplastic or thermoset polymer, Kevlar®, an alternative metal, or any other non-standard plastic material.

Another aspect of the method of construction includes permanently bonding the wheel cladding to the wheel via at least one of a urethane foam, a room temperature vulcanization silicone adhesive, or an alternate adhesive, such as epoxy or silicone-based hot melt adhesive.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected aspects and not all implementations, and are not intended to limit the present disclosure to only that actually shown. With this in mind, various features and advantages of example aspects of the present disclosure will become apparent to one possessing ordinary skill in the art from the following written description and appended claims when considered in combination with the appended drawings, in which:

DETAILED DESCRIPTION OF THE DISCLOSURE

Figure 1:
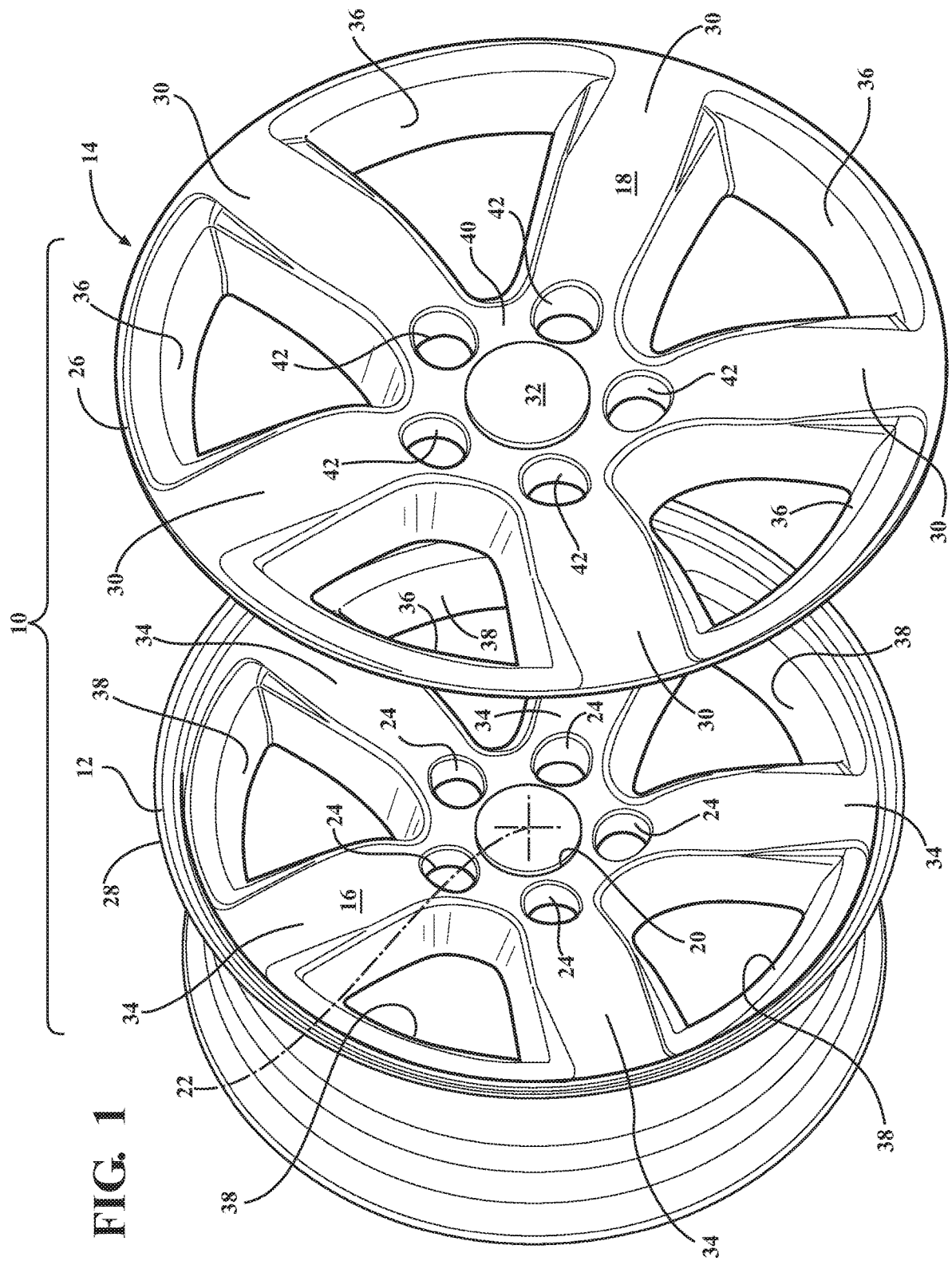
FIG. 1 is a perspective view of a composite wheel assembly including a wheel and a cladding constructed in accordance with an aspect of the disclosure.

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

Referring in more detail to the drawings, FIG. 1 illustrates a composite wheel assembly 10 comprising a wheel 12 made of aluminum, magnesium, steel, or other material conventionally used for manufacturing vehicle wheels. The composite wheel assembly 10, in accordance with one aspect of the disclosure, may be constructed by permanently bonding a wheel cladding 14 to a front, outwardly facing surface 16 of the wheel 12. The cladding 14 may be formed, at least in part, of a high strength and/or high stiffness material, thereby functioning not only as a decorative member, but also as a stiffening member to add strength and/or stiffness to the composite wheel assembly 10. An outer surface 18 of the cladding 14 can be painted, textured or otherwise finished to provide a particularly desired aesthetic appearance, such as a metal plated surface, by way of example and without limitation.

The wheel 12 can be formed having a central hub 19 with an opening, also referred to as hub aperture 20, formed therein and about an axis 22 about which the composite wheel assembly 10 rotates. The wheel 12 can further be formed having a plurality of apertures 24 extending through or adjacent the hub 19, with the apertures 24 being arranged in a pattern, such as a circular pattern, and spaced for receipt of lugnuts (not shown) to facilitate fixation of the composite wheel assembly 10 to the desired vehicle platform. The wheel 12 further includes an outer peripheral rim 28, and in accordance with one aspect, a plurality of spokes 34 can be provided to extend radially between the hub 19 and the outer peripheral rim 28, thereby defining a plurality of corresponding windows, also referred to as turbine openings or simply openings 38.

The wheel cladding 14 can be formed having a geometry which substantially conforms to that of the outwardly facing surface 16 of the wheel 12, namely, having an outer peripheral rim 26 which matingly fits within or on top of the outer peripheral rim 28 of the wheel 12. The cladding 14 is shown, by way of example and without limitation, having a plurality of cladding spokes 30 extending radially outward from a centrally-located hub region, shown as having a hub aperture 32, by way of example and without limitation, wherein the cladding spokes 30 correspond in size, shape and location to a plurality of wheel spokes 34. The composite wheel assembly 10 may further include a cap member 48 snappably connected to the wheel 12 and/or to the wheel cladding 14 within the central hub apertures 20, 32 thereof.

Located between the spokes 30 of the cladding 14, a plurality of windows or openings 36 can be provided to align with corresponding ones of the turbine openings 38 of the wheel 12. The openings 36 can be shaped and sized to be the same as the turbine openings 38 to mate therewith, or they could be sized differently, either smaller and/or larger, or shaped differently, depending on the aesthetic desired. A recessed central hub region 40 surrounds the central hub aperture 32 of the cladding 14, that also includes a plurality of lugnut receiving apertures 42 which align and register with the apertures 24 of the wheel 12 when the wheel cladding 14 is fixedly attached to the wheel 12. The hub aperture 32 is aligned and registered with the hub aperture 20 in the wheel 12 upon fixing the cladding 14 to the wheel 12. As a result, the wheel cladding 14 appears as an integral, aesthetically pleasing outwardly facing surface of the composite wheel assembly 10.

The wheel cladding 14 is provided to enhance the strength and/or stiffness of the wheel 12, and thus, the wheel 12 can be formed having minimal material, minimal overall envelop, and thus, minimal weight, which are all desired for modern wheel assemblies of high performance vehicles. Some of the high strength, high stiffness materials contemplated for the wheel cladding 14 include carbon fiber, fiber-glass, molded thermoplastic or thermoset polymer, Kevlar®, an alternative metal, or any other non-standard plastic material that would significantly enhance the stiffness and/or strength of the wheel 12, wherein the aforementioned materials can be used individually or in any desired combination with one another. The cladding 14 can be provided having the desired thickness for the intended application, wherein a thickness between about 1-3 mm is considered preferential, though slightly decreased or increased deviations up to about 50% are contemplated herein.

In assembly, the cladding 14 can be bonded to the wheel 12 via continuous or segmented beads of a bonding adhesive (s) that is sufficiently rigid to transfer the applied loads from the wheel 12 to the cladding 14, thereby enhancing the overall strength and bending stiffness of the wheel assembly 10 as a whole. Some exemplary aspects of a suitable adhesive include a urethane foam, room temperature vulcanization silicone adhesive (RTV), or an alternate adhesive, such as epoxy, silicone-based hot melt adhesive, or any other suitable adhesive that would permanently fix the wheel cladding 14 to the wheel 12 for the duration of the useful life of the vehicle. It is to be recognized that the selected adhesive can be placed on an inner surface of the cladding material 14 and/or on the outwardly facing surface 16 of the wheel 12 as a continuous layer or in sections or patterns, as desired. Once a bead of the adhesive is applied to at least one of the fixating inner surface of the cladding 14 and/or to the fixating outer surface 16 of the wheel 12, the wheel cladding 14 is aligned with the wheel 12, as desired, and the wheel cladding 14 is then pressed against the outwardly facing surface 16 of the wheel 12 for permanent fixation thereto. In one present exemplary aspect, a wheel cladding 14 may be constructed of a carbon fiber having a thickness of about 1 mm, wherein the cladding 14 can be bonded to the wheel 12 via an adhesive of RTV along with injected urethane foam, with the wheel assembly 10 resulting in an increased bending stiffness between about 2-16%, and preferably between about 8-16%, as compared to the wheel 12 not having the cladding 14, when deflection was measured at the outer peripheral rim 28 in areas at the end of the wheel spokes 34 and at the center of an arc that spans a wheel window 38 at the outer peripheral rim 28.

According to a still further aspect, while the cladding 14 may be a monolithic, single piece, full face structure that is permanently bonded to the wheel 12 to impart stiffness, the cladding 14 may alternatively consist of a multiple piece assembly. For example, the cladding 14 may be formed of a plastic painted or metal plated polymeric structure with a stiffening backing structure fixedly secured to the rear surface of the cladding 14. According to an aspect, the stiffening backing structure may be disposed along the entire back side of the cladding 14 or alternatively may be disposed in select locations in order to impart stiffness, as desired. The backside of the cladding 14 with the stiffening backing structure may be a non-aesthetic structure that imparts stiffness and can be constructed of a variety of suitable materials, including as described herein.

Figure 1A:
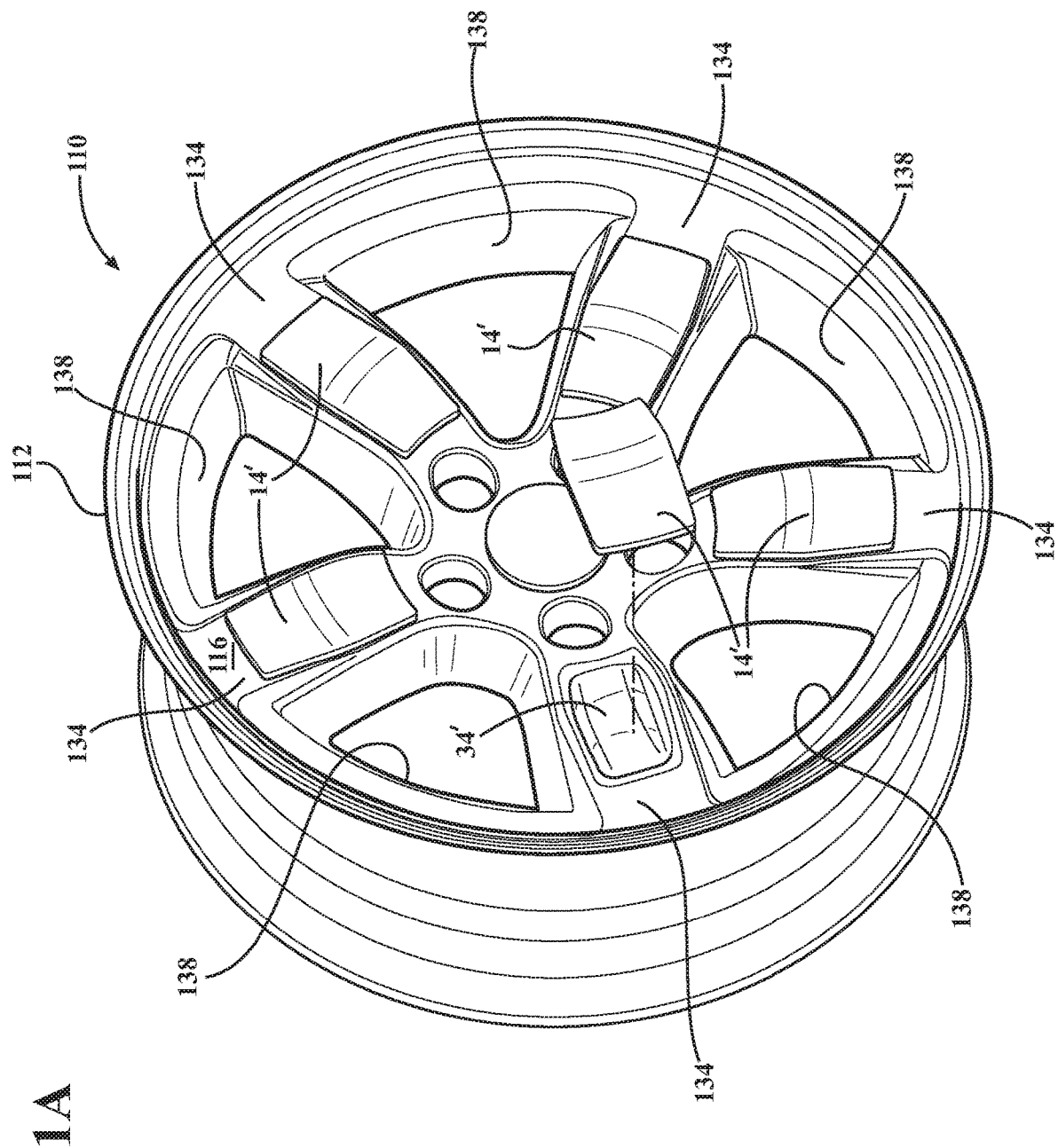
FIG. 1A is a partially exploded perspective view of a composite wheel assembly including a wheel and a cladding constructed in accordance with an aspect of the disclosure.

FIG. 1A illustrates a wheel assembly 110 in accordance with another aspect, wherein the same reference numerals as used above, offset by a factor of 100, are used to identify like features. The wheel assembly 110 includes a plurality of cladding stiffening members 14' that may be discretely placed on the front, outwardly facing surface 116 of the wheel 112 to serve decorative, strengthening and stiffening functions. For example, the cladding stiffening members 14' may be disposed on the front, outwardly facing surface 116 of at least some or each of the wheel spokes 134, and can be disposed within recessed pockets 34' formed within at least some or each of the wheel spokes 134, shown as being formed between opposite sides of each of the spokes 134, by way of example and without limitation, with the remaining portions of the wheel outwardly facing surface 116 remaining exposed for aesthetic viewing. Furthermore, it is to be recognized that aside from the cladding stiffening members 14', it will also be appreciated that a purely decorative cladding or wheel cover may be secured to one or more portions of the front, outwardly facing surface 116 of the wheel 112. Further yet, in addition to the cladding stiffening members 14' on the outwardly facing surface 116, one or more cladding stiffening members 14' can be disposed on sides of the spokes 134, or in the turbine openings 138 to both add structural integrity and strength to the wheel 112 and for decorative purposes as well. Further yet, stiffening members, as discussed further below, may be secured to the backside of the spokes 134.

Figure 2:
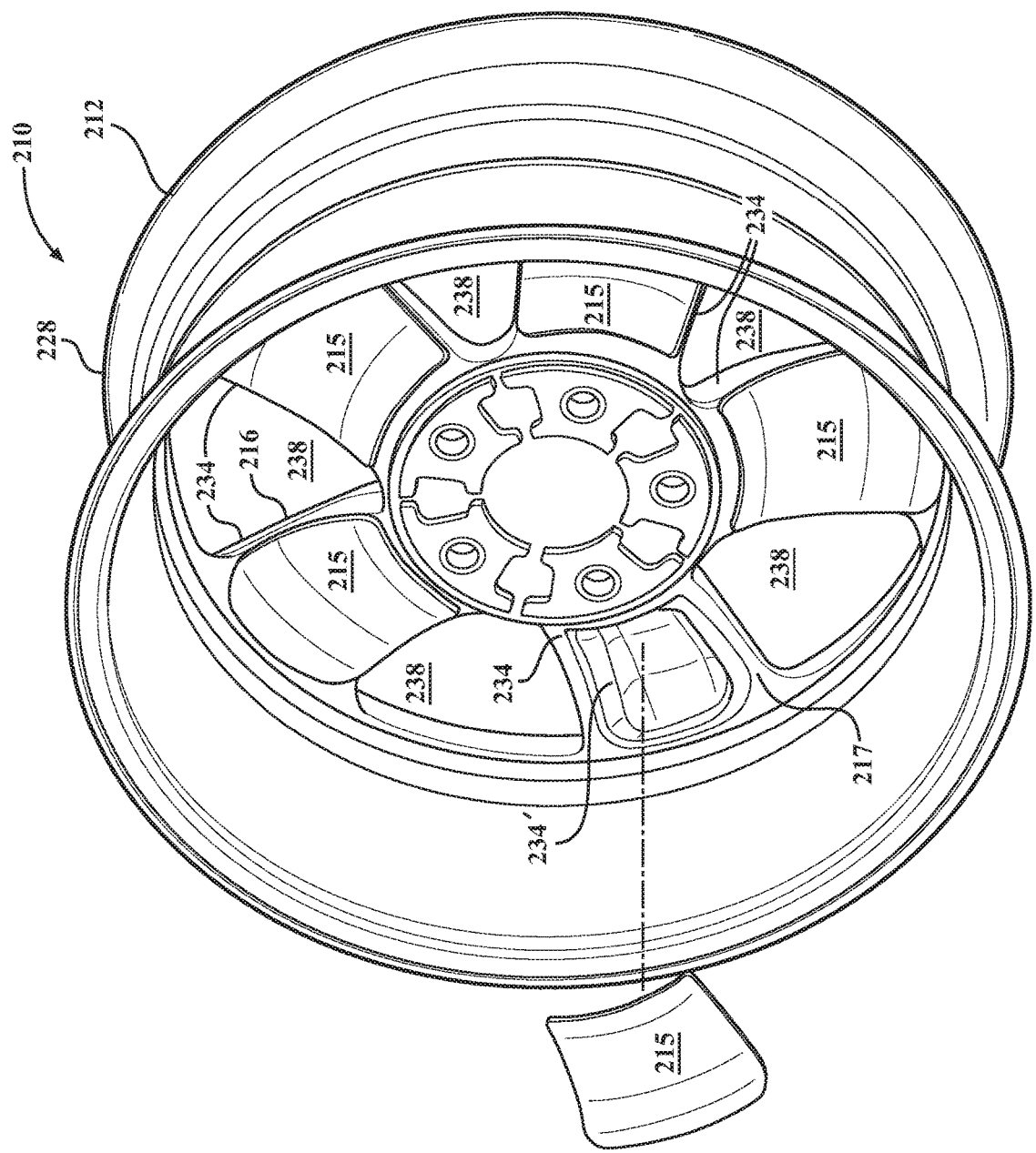
FIG. 2 is a partial exploded perspective view of a wheel assembly including a plurality of wheel backside inserts in accordance with an aspect of the disclosure.

FIG. 2 illustrates a wheel assembly 210 in accordance with another aspect, wherein the same reference numerals as used above, offset by a factor of 200, are used to identify like features. The wheel assembly 210 includes a wheel 212. The wheel assembly 210 is shown not having a wheel cladding attached to an outwardly facing surface 216 of the wheel 212, though it will also be appreciated that the wheel assembly 210 could include a cladding fixed to the outer surface 216, if desired. The wheel 212 may include an outer peripheral rim 228 and a central hub opening 220. The wheel 212 can include a plurality of spokes 234 that extend generally between the central hub 219 and the outer peripheral rim 228. The plurality of spokes 234 can define a plurality of wheel turbine openings 238.

According to an aspect, at least some or each of the plurality of spokes 234 may have wheel claddings, referred to hereafter as insert portions 215, secured to an inwardly facing surface thereof, also referred to as backside or inner side 217. The backside 217 of the spokes 234 may include recessed pockets 234' formed therein, with the recessed pockets 234' shown as extending between opposite sides of each of the spokes 234, by way of example and without limitation, which are each configured to receive the insert portions 215. The insert portions 215 may be snap fit or otherwise secured to the backside 217 of the wheel 212 within the pockets 234'. The insert portions 215 may be formed of a high strength, tough material, as discussed above, in order to impart added stiffness to the wheel 212. For example, the insert portions 215 may be formed of a carbon fiber, fiber-glass, molded thermoplastic or thermoset polymer, Kevlar®, an alternative metal or any other non-standard plastic material that would significantly enhance the stiffness and/or strength of the wheel 212. According to an aspect, the use of the stiffening insert portions 215 can significantly increase the stiffness and strength of the wheel assembly 210. It will be appreciated that any number of insert portions 215 may be employed as desired.

Figure 3:
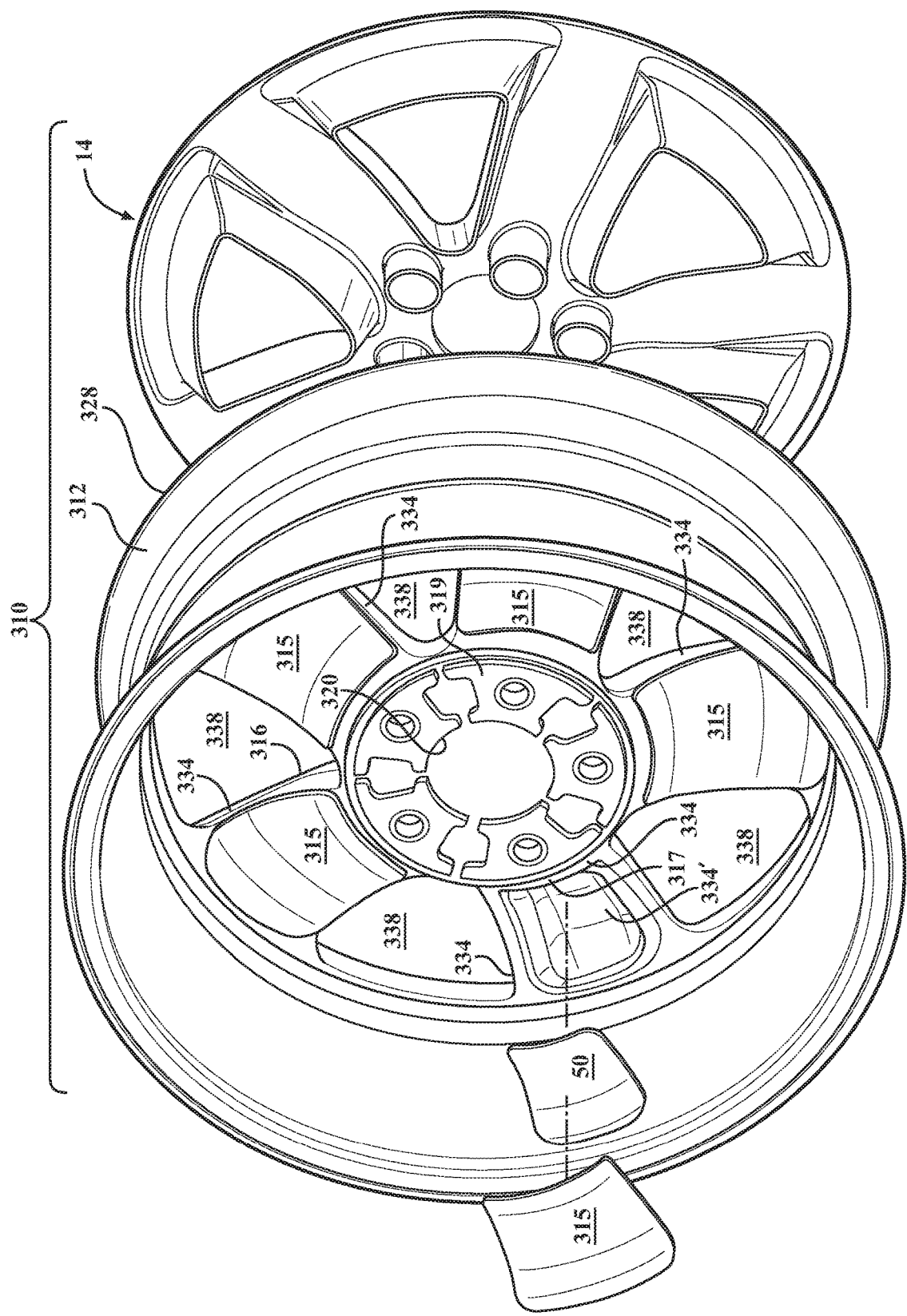
FIG. 3 is a partial exploded view of a wheel assembly including a plurality of wheel backside inserts secured thereto with a foam in accordance with an aspect of the disclosure.

FIG. 3 illustrates a wheel assembly 310 in accordance with another aspect, wherein the same reference numerals as used above, offset by a factor of 300, are used to identify like features. The wheel assembly includes a wheel cladding 14 attached to an outwardly facing surface 316 of the wheel 312. It will also be appreciated that the wheel assembly 310 may have a decorative outer surface without a cladding. The wheel 312 may include an outer peripheral rim 328 and a central hub opening 320. The wheel 312 can include a plurality of spokes 334 that extend generally between the central hub 319 and the outer peripheral rim 328. The plurality of spokes 334 may define a plurality of wheel turbine openings 338.

According to an aspect, the plurality of spokes 334 may have wheel claddings, referred to hereafter as insert portions 315, secured to a backside or inner side 317 thereof. The spokes 334 may include pockets 334' formed therein which are configured to receive the insert portions 315. The insert portions 315 may be secured to the backside 317 of the wheel 312, such as within the pockets 334' such as by a high strength foam adhesive 50. It will be appreciated that a variety of the suitable adhesives may be employed. The insert portions 315 may be formed of a material in order to impart added stiffness to the wheel 312. For example, the insert portions 315 may be formed of a carbon fiber, fiber-glass, molded thermoplastic or thermoset polymer, Kevlar®, an alternative metal or any other non-standard plastic material that would significantly enhance the stiffness and/or strength of the wheel 312. According to an aspect, the use of the stiffening insert portions 315 and the stiffening cladding 14 can significantly increase the stiffness and strength of the wheel assembly 310. It will be appreciated that any number of insert portions 315 may be employed as desired.

Figure 4:
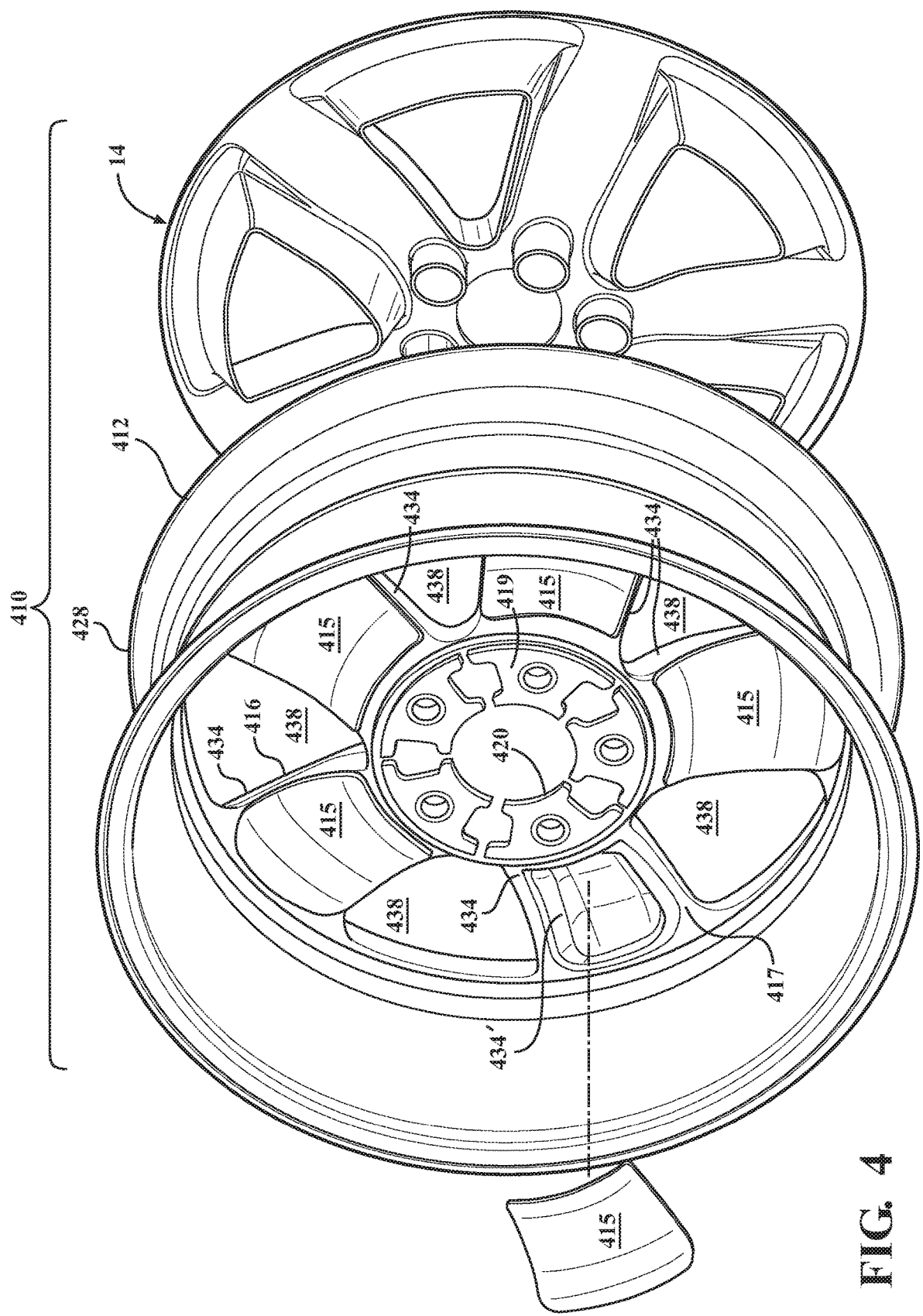
FIG. 4 is a partial exploded view of a wheel assembly including a plurality of wheel backside inserts secured with a bonding agent in accordance with still another aspect of the disclosure.

FIG. 4 illustrates a wheel assembly 410 in accordance with another aspect, wherein the same reference numerals as used above, offset by a factor of 400, are used to identify like features. The wheel assembly includes a wheel cladding 14 attached to an outwardly facing surface 416 of the wheel 412. The wheel 412 may include an outer peripheral rim 428 and a central hub 419 having a central hub opening 420. The wheel 412 can include a plurality of spokes 434 that extend generally between the central hub 419 and the outer peripheral rim 428. The plurality of spokes 434 may define a plurality of wheel turbine openings 438.

According to an aspect, the plurality of spokes 434 may have wheel claddings, referred to hereafter as insert portions 415 secured to a backside or inner side 417 thereof. The spokes 434 may include pockets 434' formed therein which are configured to receive the insert portions 415. The insert portions 415 may be secured to the backside 417 of the wheel 412, such as within the pockets 434' such as by a high strength bonding agent. It will be appreciated that a variety of the suitable adhesives may be employed. The insert portions 415 may be formed of a material in order to impart added stiffness to the wheel 412. For example, the insert portions 415 may be formed of a carbon fiber, fiber-glass, molded thermoplastic or thermoset polymer, Kevlar®, an alternative metal or any other non-standard plastic material that would significantly enhance the stiffness and/or strength of the wheel 412. According to an aspect, the use of the stiffening insert portions 415 and the stiffening cladding 14 can significantly increase the stiffness and strength of the wheel assembly 410. It will be appreciated that any number of insert portions 415 may be employed as desired.

Figure 5:
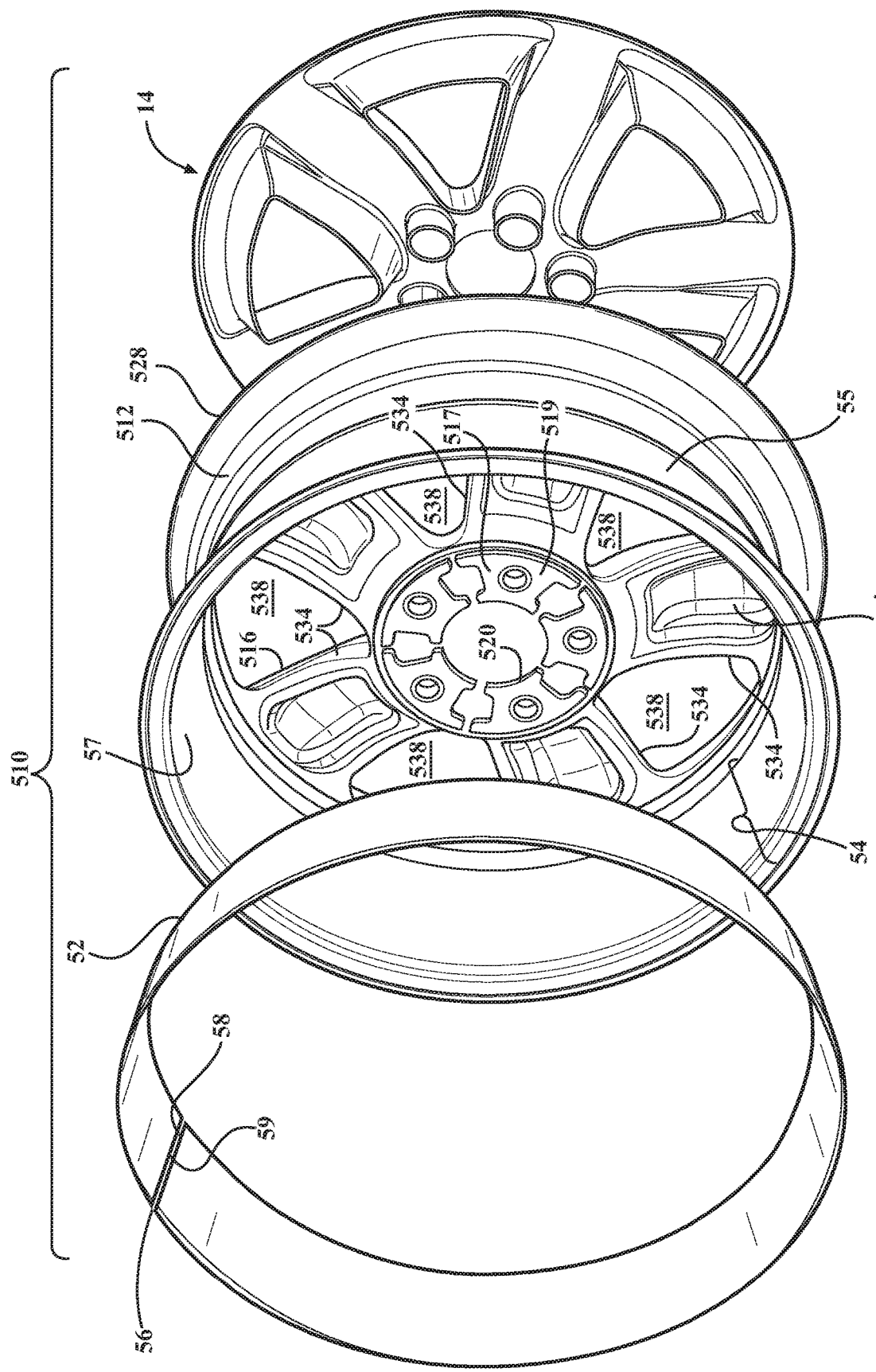
FIG. 5 is an exploded view of a wheel assembly with a belly band secured to the wheel rim in accordance with an aspect of the disclosure.

FIG. 5 illustrates a wheel assembly 510 in accordance with another aspect, wherein the same reference numerals as used above, offset by a factor of 500, are used to identify like features. The wheel assembly includes a wheel cladding 14 attached to an outwardly facing surface 516 of the wheel 512. The wheel 512 may include an outer peripheral rim 528 and a central hub 519 bounding an opening 520. The wheel 512 can include a plurality of spokes 534 that extend generally between the central hub 519 and the outer peripheral rim 528. The plurality of spokes 534 may define a plurality of wheel turbine openings 538.

Figure 5A:
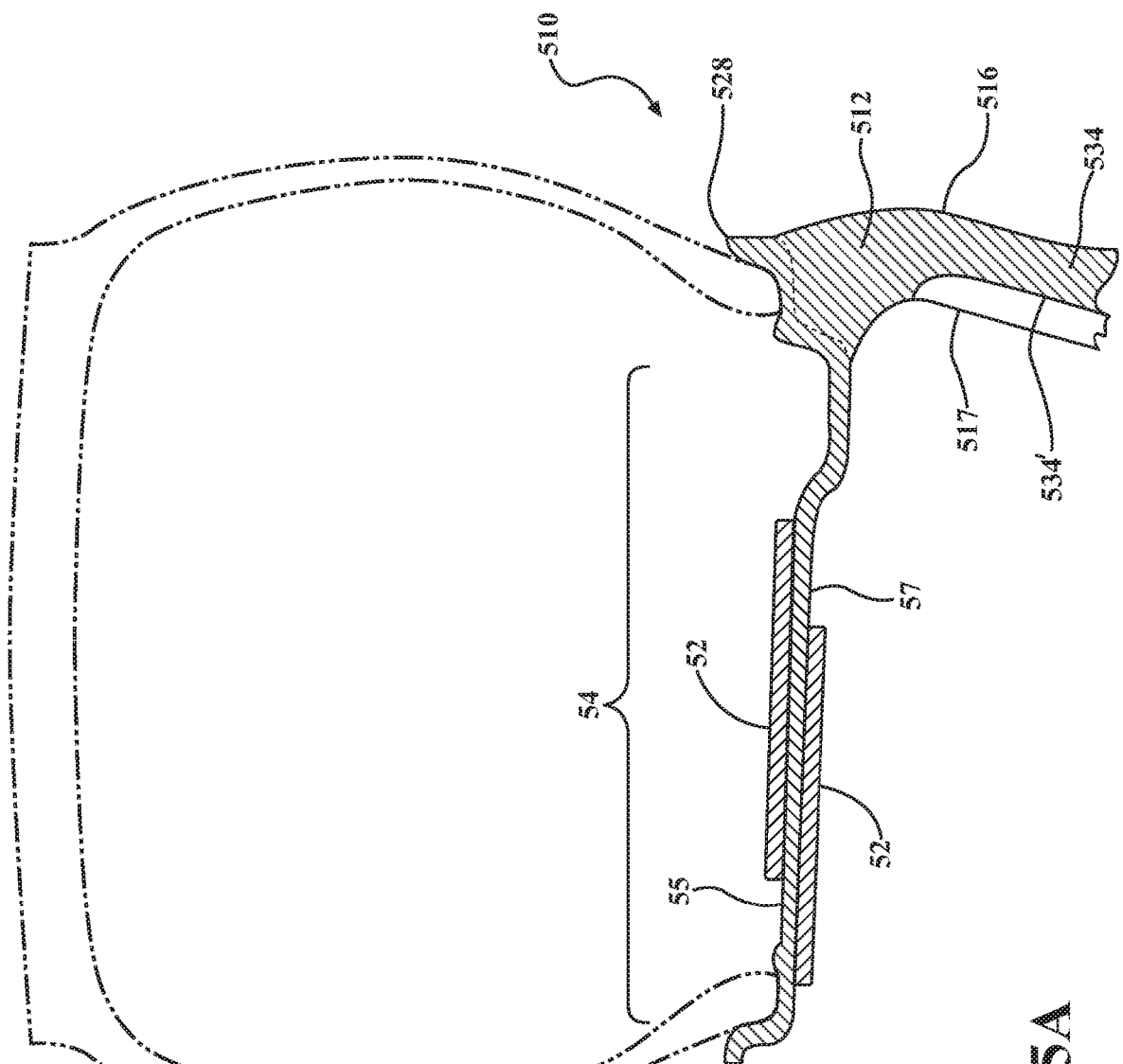
FIG. 5A is a partial cross-sectional view taken the wheel assembly of FIG. 5.

According to an aspect, a further wheel cladding in the form of a stiffening member, and in particular, in the form of an annular, generally cylindrical stiffening belly band web, also referred to as annular stiffening band or web 52, may be secured about an annular, generally cylindrical barrel portion 54 of the wheel 512 to impart strength and stiffness to the wheel 512. The annular web 52 may be formed of a carbon fiber, fiber-glass, molded thermoplastic or thermoset polymer, Kevlar®, an alternative metal or any other non-standard plastic material that would significantly enhance the stiffness and/or strength of the wheel 512. It will be appreciated that a variety of other suitable materials may be employed. The annular web 52 may be disposed, such as by being wound or wrapped, around a radially outwardly facing surface, also referred to as backside 55 (tire side), of the annular barrel portion 54 of the wheel 512 and secured to the outwardly facing surface 55 with a high strength bonding agent. To facilitate wrapping the web 52 about the outwardly facing surface 55, the web 52 can be provided having a through split 56 to allow opposite free ends 58, 59 of the web 52 to be spread away from one another to temporarily expand the web 52 for ready disposal about the outwardly facing surface 55 of the barrel portion 54, whereupon the web 52 can be returned to constrict into abutment with the outwardly facing surface 55 of the barrel portion 54 and fixed thereto via a high strength bonding agent. Alternatively, or in combination, as shown in FIG. 5A, the annular web 52 may be applied to abut a radially inwardly facing surface, also referred to as inner side 57 (rotor side), of the annular barrel portion 54 of the wheel 512 and secured with a high strength bonding agent. It will be appreciated that a variety of other suitable adhesives may be employed. The annular web 52 can provide for added hoop stiffness of the barrel portion 54 of the wheel 512 and potential natural frequency change of the barrel portion in a positive direction to be even more dissimilar than the tire normal frequency. According to a still further aspect, the backside or inner side 517 of the wheel 512 may include recessed pockets 534' formed therein. The recessed pockets 534' may serve a weight relief function and may also receive inert portions, as discussed above with regard to FIGS. 2-4.

Figure 6:
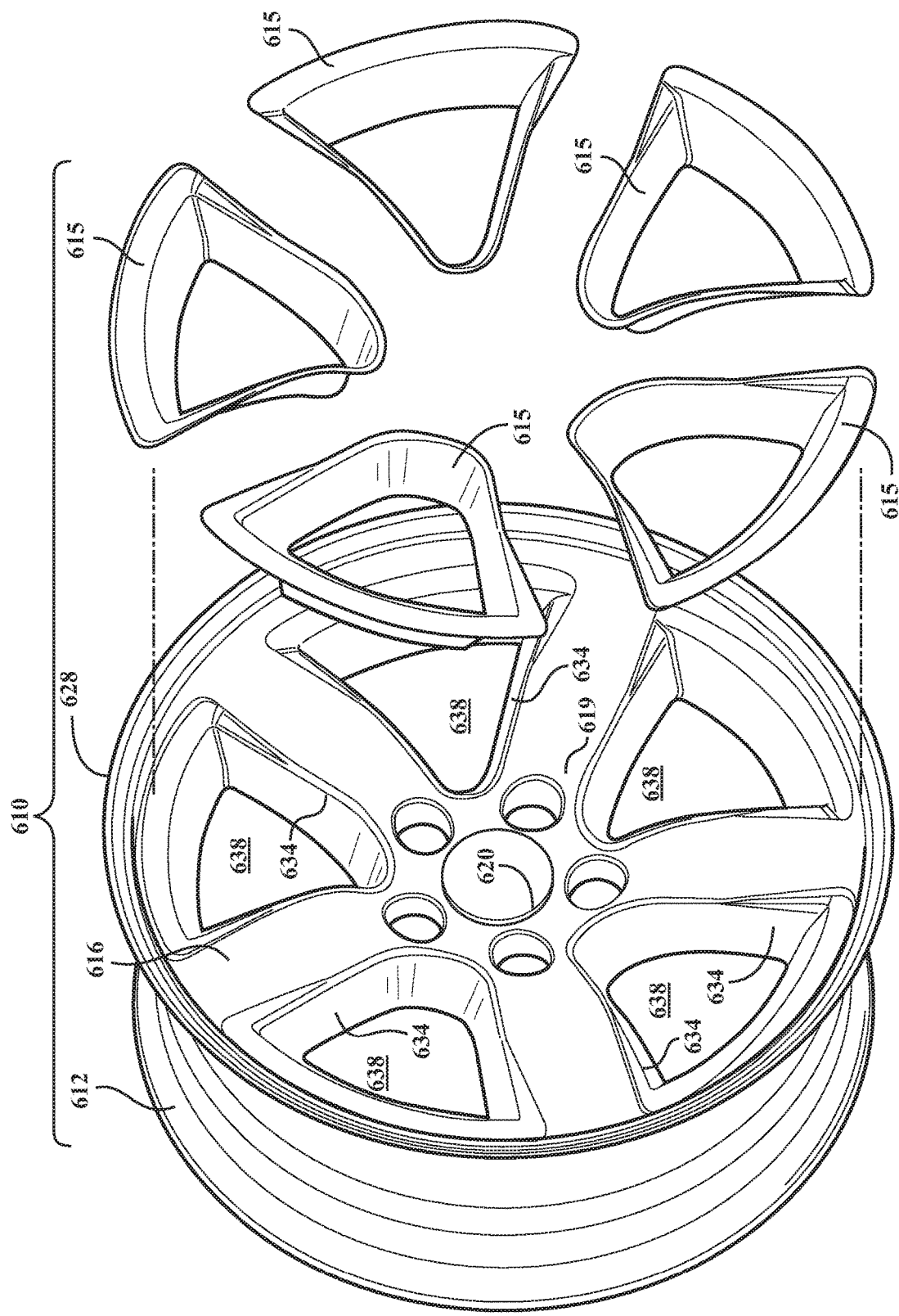
FIG. 6 is a partial exploded view of a wheel assembly with a plurality of turbine stiffening inserts in accordance with an aspect of the disclosure.

FIG. 6 illustrates a wheel assembly 610 in accordance with another aspect, wherein the same reference numerals as used above, offset by a factor of 600, are used to identify like features. The wheel assembly includes a wheel cladding 14 attached to an outwardly facing surface 616 of the wheel 612. The wheel 612 may include an outer peripheral rim 628 and a central hub opening 620. The wheel 612 can include a plurality of wheel spokes 634 that extend generally between the central hub 619 and the outer peripheral rim 628. The plurality of spokes 634 may define a plurality of wheel turbine through openings 638.

According to an aspect, the wheel assembly 610 may include a plurality of wheel claddings, referred to hereafter as insert portions or stiffening members 615, disposed in at least one or each of the wheel turbine openings 638 between the wheel spokes 634 in order to impart stiffness to the wheel 612. The stiffening members 615 are shown in a non-limiting aspect as being annular and circumferentially continuous, wherein the stiffening members 615 may be secured within the wheel turbine openings 638 by a high strength bonding agent, with the stiffening members 615 being fixed to sides of the spokes 634 and to a radially inwardly facing inside surface adjacent the wheel barrel portion. However, a variety of other suitable adhesives or fixation mechanisms may also be employed. These stiffening members 615 may be painted a complimentary color to the wheel 612 or may have a natural carbon fiber look. Again, these stiffening members 615 may be formed of a variety of different materials, including carbon fiber tape, aramid, Kevlar, glass fiber or a variety of other suitable materials. These stiffening members 615 may be used in conjunction with a cladding 14 or other stiffening members as disclosed herein. It will also be appreciated that other stiffening features as disclosed herein may also be employed.

According to an aspect, the adhesive used herein may be selected to transfer stiffness from the wheel 12, 112, 212, 312, 412, 512, 612 to the cladding/stiffening member such that the wheel assembly 10, 110, 210, 310, 410, 510, 610 has the desired increased wheel stiffness. The material employed for the cladding/stiffening member may be selected such that it has a modulus of elasticity, which combined with its moment of inertia, will result in stiffness of the cladding/stiffening member.

According to an aspect, the present disclosed composite wheel assembly 10, 110, 210, 310, 410, 510, 610, including the wheel 12, 112, 212, 312, 412, 512, 612 and wheel cladding/insert or stiffing member, can reduce the amount of material required to construct the composite wheel assembly 10, 110, 210, 310, 410, 510, 610, thereby reducing the weight of the composite wheel assembly 10, 110, 210, 310, 410, 510, 610.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A composite wheel assembly, comprising:
   a wheel having an inwardly facing surface and an outwardly facing surface, a plurality of apertures formed about a central hub aperture, a plurality of wheel spokes extending radially outwardly from the central hub aperture, and a plurality of turbine openings formed between the plurality of spokes; and
   at least one wheel cladding fixedly bonded to at least the outwardly facing surface of the wheel; and
   at least one stiffening member secured to the wheel, wherein at least a portion of the at least one stiffening member overlies a portion of an outer or inner face of one of the plurality of spokes and covers a recess extending into the spoke from the outer or inner face, wherein an opening of the recess is greater than a base surface of the recess;
   wherein the wheel cladding and the at least one stiffening member enhance the stiffness and/or strength of the wheel between about 2-16% or greater.

2. The composite wheel assembly of claim 1, wherein the at least one wheel cladding is formed of material consisting of at least one of carbon fiber, fiber-glass, molded thermoplastic or thermoset polymer, or heat-resistant synthetic fiber.

3. The composite wheel assembly of claim 1, wherein the at least one wheel cladding is bonded to the wheel via at least one of a urethane foam, a room temperature vulcanization silicone adhesive, epoxy, or silicone-based hot melt adhesive.

4. The composite wheel assembly of claim 1, wherein the at least one wheel cladding includes a single, monolithic piece of material having a central hub region, an outer peripheral rim, and a plurality of spokes extending radially between the central hub region and the outer peripheral rim fixed to the outwardly facing surface of the wheel.

5. The composite wheel assembly of claim 1, further comprising a plurality of stiffening members, each disposed on a respective one of the plurality of wheel spokes.

6. The composite wheel assembly of claim 5, further comprising: a plurality of recesses with a recess disposed on each of the plurality of spokes, each of the plurality of recesses extending into the outwardly facing surface and wherein the plurality of stiffening members are secured in a respective one of the recesses.

7. The composite wheel assembly of claim 5, further comprising: a plurality of recesses with a recess disposed on each of the plurality of spokes, each of the plurality of recesses formed on the inwardly facing surface of the spokes and wherein the plurality of stiffening members are secured in a respective one of the recesses.

8. The composite wheel assembly of claim 7, wherein the plurality of stiffening members are secured within the relief pocket by at least one of a mechanical fastener, a high strength foam adhesive, or a high strength bonding agent.

9. The composite wheel assembly of claim 1, wherein the at least one stiffening member is formed of material consisting of at least one of carbon fiber, fiber-glass, molded thermoplastic or thermoset polymer, or heat-resistant synthetic fiber.

10. A composite wheel assembly, comprising:
a wheel having an inwardly facing surface and an outwardly facing surface, a plurality of apertures formed about a central hub aperture, a plurality of wheel spokes extending radially outwardly from the central hub aperture, and a plurality of turbine openings formed between the plurality of spokes; and
at least one wheel cladding fixedly bonded to at least the outwardly facing surface of the wheel; and
at least one stiffening member secured to the wheel;
wherein the wheel cladding and the at least one stiffening member enhance the stiffness and/or strength of the wheel between about 2-16% or greater;
wherein the at least one stiffening member includes an annular stiffening band secured to a generally cylindrical barrel portion of the wheel to impart stiffness to the wheel.

11. The composite wheel assembly of claim 10, wherein the annular stiffening band abuts a radially outwardly facing outer surface of the generally cylindrical barrel portion.

12. The composite wheel assembly of claim 10, wherein the annular stiffening band abuts a radially inwardly facing inner surface of the generally cylindrical barrel portion.

13. A composite wheel assembly, comprising:
a wheel having an inwardly facing surface and an outwardly facing surface, a plurality of apertures formed about a central hub aperture, a plurality of wheel spokes extending radially outwardly from the central hub aperture, and a plurality of turbine openings formed between the plurality of spokes; and
at least one wheel cladding fixedly bonded to at least the outwardly facing surface of the wheel; and
at least one stiffening member secured to the wheel;
wherein the wheel cladding and the at least one stiffening member enhance the stiffness and/or strength of the wheel between about 2-16% or greater;
wherein the at least one stiffening member consists of a plurality annular wheel stiffening members fixed within the turbine openings.

14. A composite wheel assembly, comprising:
a wheel having an inwardly facing surface, an outwardly facing surface, a generally cylindrical barrel portion, and a plurality of apertures formed about a central hub aperture;
at least one wheel cladding fixedly bonded to the outwardly facing surface, wherein the wheel cladding is constructed of a non-standard plastic material in order to provide enhanced stiffness and strength; and
at least one stiffening member secured to the wheel;
wherein the wheel cladding and the at least one stiffening member enhance the stiffness and/or strength of the wheel assembly between about 2-16% or greater;
wherein at least a portion of the at least one stiffening member overlies a portion of an outer or inner face of one of a plurality of spokes and covers a recess extending into the spoke from the outer or inner face, wherein an opening of the recess is greater than a base surface of the recess.

15. The composite wheel assembly of claim 14, wherein the wheel cladding and the at least one stiffening member are formed of materials consisting of at least one of carbon fiber, fiber-glass, molded thermoplastic or thermoset polymer, or heat-resistant synthetic fiber.

16. The composite wheel assembly of claim 15, wherein the at least one stiffening member includes an annular stiffening band secured to the generally cylindrical barrel portion of the wheel.

17. The composite wheel assembly of claim 15, wherein the at least one wheel cladding includes a single, monolithic piece of material having a central hub region, an outer peripheral rim, and a plurality of spokes extending radially between the central hub region and the outer peripheral rim fixed to the outwardly facing surface of the wheel.

18. The composite wheel assembly of claim 17, further comprising: a plurality of stiffening members fixed to the inwardly facing surface of the wheel.

19. A method of constructing a composite wheel assembly, comprising:
providing a wheel having an inwardly facing surface, an outwardly facing surface, a generally cylindrical barrel portion, and a plurality of apertures formed about a central hub aperture; and
fixedly bonding at least one wheel cladding to outwardly facing surface of the wheel; and
attaching at least one stiffening member to the wheel, wherein at least a portion of the at least one stiffening member overlies a portion of an outer or inner face of one of a plurality of spokes and covers a recess extending into the spoke from the outer or inner face, wherein an opening of the recess is greater than a base surface of the recess;
whereby the enhancing the stiffness and/or strength of the wheel is enhanced between 2-16% or greater.

* * * * *